Feb. 13, 1934.   P. B. CAMP   1,947,405
AUTOMATIC SLACK ADJUSTER
Original Filed May 17, 1928
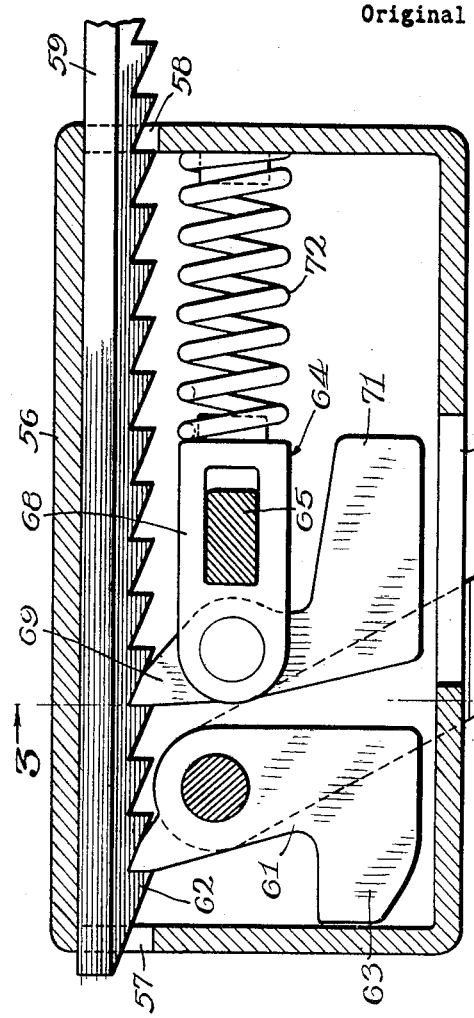
Inventor:
Percy B. Camp
By Gillson, Mann & Cox Attys.

Patented Feb. 13, 1934

1,947,405

UNITED STATES PATENT OFFICE 1,947,405

AUTOMATIC SLACK ADJUSTER

Percy B. Camp, Maywood, Ill., assignor to Universal Draft Gear Attachment Company, Chicago, Ill., a corporation of Illinois Original application May 17, 1928, Serial No. 278,518. Divided and this application April 22, 1931. Serial No. 531,924

6 Claims. (Cl. 188—200)

This is a division of my copending application, Serial No. 278,518, filed May 17, 1928, and relates to a mechanically operated automatic slack adjuster so arranged with respect to the foundation brake gear of a railway car that all excess slack in the brake gear is automatically taken up upon operation of the air brakes.

Other and further objects and advantages will become apparent as the disclosure proceeds and the description is read in conjunction with the accompanying drawing, in which—

Fig. 1 is a plan view of a portion of the brake gear adjacent the air brake cylinder showing the adjuster working on the fulcrum of the dead cylinder lever to effect the desired adjustment;

Fig. 2 is a longitudinal vertical section of the adjuster taken on the line 2—2 of Fig. 1;

Fig. 3 is a transverse vertical section taken on the line 3—3 of Fig. 2.

The slack adjuster is shown applied to conventional freight equipment which comprises live and dead cylinder levers 13 and 14, respectively, connected by a tie-rod 15 and actuated by the air brake cylinder in the usual manner. The free end of the live cylinder lever 13 is connected to the truck brake rigging at one end of the car by a top rod 22 while the corresponding end of the dead cylinder lever 14 is connected to the truck brake rigging at the other end of the car by top rod 23. The dead cylinder lever 14 is adjustably fulcrumed on the car body, and it is by properly positioning the fulcrum of this lever that the foundation brake gear is regulated.

The slack adjuster which is generally indicated at 55 comprises a casing 56 rigidly secured to the underframe of the car. The two end walls of the casing are provided with aligned T-apertures 57 and 58 through which the correspondingly shaped rachet bar 59 is adapted to slide. The bar 59 has ratchet teeth 62 on its lower face and is adapted to be anchored at a plurality of positions within the casing 56. One end of the bar 59 is pivoted to the dead cylinder 14 and forms the fulcrum therefor, and may therefore be termed a fulcrum element.

A pawl 61, having a weighted tail piece 63, is pivoted in the casing and is normally held in engagement with the ratchet bar 59 by the weight of handle 60 which is mounted on the same shaft with the pawl. When new brake shoes are to be installed, the pawl may be released by lifting on the handle.

The casing is provided with an enlargement 67 to which is pinned a lever 65 at 66. The lever 65 passes through the side of the casing and is connected at its free end to a rod 73 having a slotted or loose motion connection with the live cylinder lever 13. The slot 74 in which the anchoring pin 75 is permitted to travel corresponds in length to normal piston travel so that the lever 65 is never actuated unless the piston exceeds its normal travel.

A pawl support 64 is sleeved upon the lever 65 between the side walls of the casing and pivotally supports a pawl 69 having a weighted end 71. Pawl 69, which, for convenience, will be called the driving pawl, is normally in the position shown in Fig. 2, but is moved to the right upon excess travel of the piston in the air brake cylinder against the resistance of a spring 72 interposed between the pawl support 64 and the forward end of the casing. If the excess movement of the piston is sufficiently great, the pawl 69 will advance one or more teeth on the ratchet bar and upon release of the brakes will force the ratchet bar to the left, through the agency of the spring 72, to establish a new fulcrum for the dead cylinder lever.

As the ratchet bar is moved to the left, the ratchet teeth 62 pass over the pawl 61 which holds it against reverse movement. When new brake shoes are to be installed, the brake gear may be released by lifting the handle 60 which causes the tail piece 63 of the holding pawl 61 to strike the tail piece 71 of the driving pawl, thus disengaging both of the pawls from the ratchet bar. With the pawls thus freed from the bar, the dead lever handle may be pulled to the right (Fig. 1), thereby allowing sufficient clearance for the insertion of the new brake shoes.

After the new shoes have been inserted, the adjuster will automatically take up any excess slack upon the first application of the air brake.

A suitable opening 90 may be provided in the bottom wall of the casing 56 through which the holding devices and associated mechanism may be inserted.

A particularly desirable feature of this automatic adjuster is found in the arrangement whereby the adjuster compensates for only a fractional part of the excess piston travel whenever such excess occurs. It is well known to those skilled in the art, that the chief disadvantage of an automatic adjuster is its tendency to take up the entire slack in the brake system when an emergency application of the brakes is made. In the adjuster of this invention, the tendency is greatly reduced, since the position of the driving pawl on the brake lever 65 restricts the adjustment of the brake gear to approximately one-half of the excess piston travel.

The tendency may be further reduced by lengthening the lever 65 so that a still smaller fractional part of excess piston travel will be taken up. The arrangement therefore serves as a guard against undesirable over adjustment.

It is thought from the foregoing taken in connection with the accompanying drawing that the construction and operation of the slack adjuster herein disclosed will be apparent to those skilled in the art, but it is realized that various changes in size, shape, proportion and details of construction may be made without departing from the spirit and scope of the appended claims.

What I claim is—

1. In a brake system for railway cars including a live cylinder lever, a dead cylinder lever and an air cylinder for operating said levers, the combination of means for shifting the fulcrum of the dead lever to regulate the slack in the system and correct excessive piston travel comprising a casing fixed to the car underframe, a rack slidably mounted within the casing and serving as a fulcrum for the dead lever, a driving pawl adapted to be advanced along the rack a fractional part only of the excess piston travel whenever such excess occurs, a spring in the casing associated with the driving pawl and returning the driving pawl to normal position upon release of the brakes, and a holding pawl for holding the rack in adjusted position.

2. In a brake system for railway cars including a live cylinder lever, a dead cylinder lever and an air cylinder for operating said levers, the combination of means for shifting the fulcrum of the dead lever to regulate the slack in the system and correct excessive piston travel comprising a relatively fixed casing, a rack slidably mounted within the casing and serving as a fulcrum for the dead lever, an actuating lever extending transversely through the casing, a driving pawl carried by the lever and engageable with the rack, a lost motion connection between the adjusting lever and the power end of the live cylinder lever whereby the actuating lever is moved only upon excessive piston travel, a spring adapted to return the driving pawl and actuating lever to normal position upon release of the brakes, and a holding pawl to maintain the adjustment.

3. In a brake system for railway cars including a live cylinder lever receiving power at one end from an air brake cylinder, and a dead cylinder lever diagonally fulcrumed with respect to said end to the underframe of the car, the combination of means to adjust said dead cylinder lever fulcrum to regulate the system comprising a casing fixed to the car underframe, a fulcrum element slidable within the casing and serving as the fulcrum for the dead cylinder lever, means within the casing for securing the bar in a plurality of positions, a driving member associated with the bar for moving the latter to effect an adjustment and a lost motion connection between the driving member and the power end of the live cylinder lever whereby a regulating adjustment is effected upon excessive travel of the air brake piston.

4. An adjusting device for railway brakes comprising a casing, a rack bar slidable with respect to the casing and serving as the fulcrum of a dead brake lever, a horizontal actuating lever extending transversely through the casing and automatically actuated when excess slack exists in the brake system, a driving pawl engaging the rack, sleeved upon and movable with the actuating lever, a spring adapted to return the driving pawl to normal position upon release of the brakes, and a holding pawl pivoted within the casing to hold the rack in adjusted position.

5. An adjusting device for railway brakes comprising a casing, a rack bar slidable with respect to the casing and serving as the fulcrum of a dead brake lever, an actuating lever extending transversely through the casing and automatically actuated when excess slack exists in the brake system, a driving pawl engaging the rack and movable with the actuating lever, a spring adapted to return the driving pawl to normal position upon release of the brakes, a holding pawl pivoted within the casing to hold the rack in adjusted position, and a release handle adapted to disengage both pawls from the rack to permit insertion of new brake shoes.

6. In foundation brake gear including a live cylinder lever and a dead cylinder lever, the combination of means for automatically adjusting the fulcrum of the dead lever comprising a casing, a ratchet bar connected to the fulcrum of the dead cylinder lever and slidable within the casing, a holding pawl pivoted between the walls of the casing adapted to anchor the ratchet bar against movement in one direction, a driving pawl within the casing movable only upon excess piston travel, a spring adapted to restore the driving pawl to normal position upon release of the brakes and a lever associated with the driving pawl and passing through the casing, said lever having a lost motion connection with the live cylinder lever corresponding to normal piston travel.

PERCY B. CAMP.

CERTIFICATE OF CORRECTION.

Patent No. 1,947,405.  February 13, 1934.

PERCY B. CAMP.

It is hereby certified that error appears in the printed specification of the above numbered patent requiring correction as follows: Page 2, in lines 81 and 82, claim 3, for "bar" read fulcrum element; and that the said Letters Patent should be read with this correction therein that the same may conform to the record of the case in the Patent Office.

Signed and sealed this 20th day of March, A. D. 1934.

F. M. Hopkins (Seal) Acting Commissioner of Patents.